(12) United States Patent  (10) Patent No.: US 7,453,373 B2
Cumeralto et al.  (45) Date of Patent: Nov. 18, 2008

(54) INTEGRATED METER MODULE AND UTILITY METERING SYSTEM

(75) Inventors: Scott Cumeralto, Spokane, WA (US);
Aaron J. Fitzgerald, Medford, MN (US); Gary L. Larson, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 386 days.

(21) Appl. No.: 11/261,902

(22) Filed: Oct. 28, 2005

(65) Prior Publication Data

US 2006/0114121 A1  Jun. 1, 2006

Related U.S. Application Data

(60) Provisional application No. 60/623,308, filed on Oct. 29, 2004.

(51) Int. Cl.
*G08C 15/06* (2006.01)
*G08B 23/00* (2006.01)

(52) U.S. Cl. .................. 340/870.02; 340/870.02; 340/870.03; 340/870.2; 375/133; 361/671; 361/672

(58) Field of Classification Search ........... 340/870.02, 340/870.03, 870.2; 375/133, 200, 134; 361/671, 361/672, 673
See application file for complete search history.

(56) References Cited

U.S. PATENT DOCUMENTS

| | | | |
|---|---|---|---|
| 5,298,894 | A | 3/1994 | Cerny et al. |
| 5,659,300 | A | 8/1997 | Dresselhuys et al. |
| 5,825,303 | A | 10/1998 | Bloss, Jr. et al. |
| 6,072,405 | A | 6/2000 | Sears |
| 6,246,677 | B1 * | 6/2001 | Nap et al. ............ 370/346 |
| 6,369,769 | B1 | 4/2002 | Nap et al. |
| 6,378,817 | B1 | 4/2002 | Bublitz et al. |
| 6,414,605 | B1 * | 7/2002 | Walden et al. ......... 340/870.02 |
| 2002/0054619 | A1 * | 5/2002 | Haas .................. 375/133 |
| 2007/0270012 | A1 | 11/2007 | Showcatally et al. |

OTHER PUBLICATIONS

Primedia, "RFDesign Bulletin: RF and Microwave Technology For Design Engineers," Primedia Business Magazines & Media, Jan. 8, 2004, pp. 1-8, file://C:\WINNT\Temporary%20Internet%20Files\OLK4\FW%20RFD%20Bulletin%20-%, Accessed May 25, 2004.

* cited by examiner

*Primary Examiner*—Jeff Hofsass
*Assistant Examiner*—Sisay Yacob
(74) *Attorney, Agent, or Firm*—Perkins Coie LLP (57) ABSTRACT

Utility meter modules, antenna modules, pit sets, and pit lid assemblies are described, with regard to automated meter reading (AMR) systems, that prevent metering signal attenuation, pit leakage, and battery drainage, along with other advantages, and which minimize the likelihood of damage and tampering.

22 Claims, 6 Drawing Sheets

INTEGRATED METER MODULE AND UTILITY METERING SYSTEM

CROSS REFERENCE TO RELATED APPLICATION

This application claims priority to commonly owned U.S. Provisional Patent Application No. 60/623,308, filed Oct. 29, 2004, which is herein incorporated by reference.

TECHNICAL FIELD

The embodiments described herein relate generally to automated meter reading (AMR) systems such as automated utility consumption measurements and data collection, and more particularly, to data transmission arrangements.

BACKGROUND

Historically utility consumption meter reading, such as for water, gas, or electricity, has been accomplished manually by human meter readers who traveled to the customers' premises. The relatively recent advances in this area include collection of data by telephone lines, radio transmission, walk-by, or drive-by reading systems using radio communications between the meters and the meter reading devices. The wireless meter reading systems make it possible to selectively obtain individual metering data with few personnel, and can increase reliability and technical accuracy.

Utility meters are equipped with at least a meter sensor unit, a transmitter, and an antenna. The meter sensor unit typically includes encoder circuitry coupled to the meter device to process and store the meter data. Multiple sensors or sensor systems may also be employed to identify and process data relating to tamper detection, power outages, temperature monitoring, and the like. An automatic utility meter reading (AMR) system also comprises a reader and a translator interfaced to the meter, where the translator obtains consumption readings from the meter and sends them to a reader via an RF signal or an electromagnetic field (EMF).

Wireless data gathering from meters located within subsurface meter pits ("pits") presents particular challenges. These pits provide housings for protection from environmental factors, provide access to underground water lines, gas lines, etc., and so forth. Typically pit housings are constructed from various concrete and metal materials that present transmission problems. Since the meters are often positioned at the bottom of the pits, it is difficult to achieve optimal or even acceptable RF transmission out of the pit.

In water meters, the translator and meter are sealed within the pit enclosure; however, creating an effective seal in the pit enclosure can interfere with the ability of the translator's effective transmission. In a typical pit system, where the translator is located directly underneath the pit lid or there is no translator, the RF signal from the translator or meter is attenuated by as much as 30dB and, to overcome this interference, the translator or meter must operate at a higher transmission power which increases the cost of the system, wastes energy, and quickly drains batteries in battery-powered systems. In meter systems where a cable connects the meter to the translator, the system within the pit is prone to leakage problems. If the cable is damaged, water may damage the connection between the meter and the translator, allowing faulty data to be conveyed to the reader, or may totally disable the translator.

Utility meter modules are usually located in pits having a lid, with a transmission antenna that is mounted over or through the pit lid and is connected to the other module components through a hole in the lid. Connectivity of the various components through a pit lid requires special designs, and the more complex the housing structure becomes the more costly the units will be. The protruding antennas can also be damaged by vehicles and other external forces such as curious people. Another problem is that the utility meter module components become exposed and vulnerable to potential tampering and/or environmental damage once the pit lid is removed. In general, the existing remote utility meter reading systems suffer from signal attenuation, pit leakage, and battery drainage among other problems

DETAILED DESCRIPTION

The disclosed embodiments relate to automatic utility meter reading (AMR) systems and, more particularly, to low power wireless pit systems. An AMR system comprises two modules: a utility meter module and a translator module, both of which communicate with one another via RF (radio frequency) or low frequency electromagnetic radiation. Typically in a utility pit, there is a meter, a register which either attaches to the meter or is manufactured as a part of the meter and which displays the read or communicates the meter reading to an endpoint that transmits the data to a translator or a reader.

Meter modules, antenna modules, and pit lid assemblies are described herein that, along with other advantages, prevent metering signal attenuation, pit leakage, battery drainage, and other problems with conventional designs. The disclosed modules and assemblies minimize the exposed portions of the system and the likelihood of damage and tampering. The disclosed pit set systems allow utility meter modules to wirelessly transmit data, at low power, to translator modules that in turn transmit the data as a higher power RF (radio frequency) signal to a reader.

An integrated meter module comprises a utility meter module at least partially situated inside the pit lid, such as its endpoint, and/or an integrated antenna module which comprises an antenna that is at least partially placed inside the pit lid. Both kinds of modules allow the system to reduce RF attenuation, prevent tampering, and enhance performance.

The following description of the various embodiments of the invention provides enabling and specific details for making, using, and thoroughly understanding these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1:
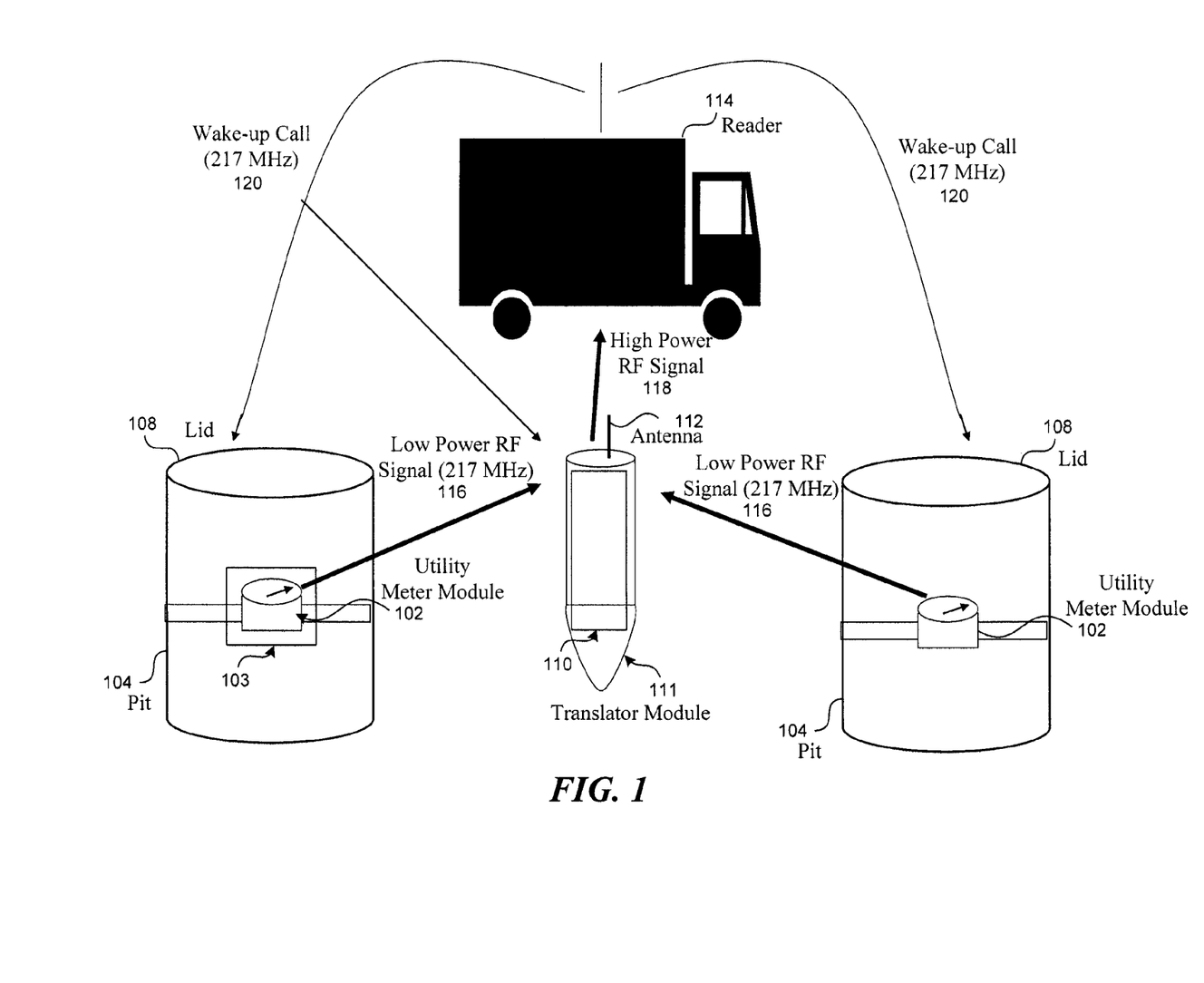
FIG. 1 illustrates components of a pit set system for utility metering comprising a utility meter module, a translator module, and a reader module.

FIG. 1 illustrates the components of an exemplary pit set system 100 for utility metering. The pit 104 contains a utility meter module 102 and is enclosed by a lid 108. The utility meter module 102 may be contained in a separate sealed housing unit 103 near the bottom of the pit 104. Note that the utility meter module 102 may include a meter, a register which communicates the meter reading to an endpoint which itself transmits the data to a translator or a reader.

The utility meter module 102 receives utility consumption data (e.g., from a utility meter) and wirelessly sends the consumption data/readings to a translator module 110, using a low power RF signal 116. The translator module 110 is contained in a separate sealed housing unit 111 near the pit 104 and close to the lid 108. The translator module 110 verifies the integrity of the received low power RF signal 116 and decodes the signal before re-transmitting signal 116 as a higher power RF signal 118 via an antenna 112.

The higher power RF signal 118 is transmitted to a reader 114. The translator module 110 may also store consumption readings until the reader 114 requests such information. The reader 114 can be a wireless module such as a handheld meter reading unit, a wireless network repeater, an intermediate transceiver, a central metering station, or other similar devices. In some embodiments the reader 114 may send a wake-up call 120 to the translator module 110 that prompts the translator module 110 to transmit the consumption readings to the reader 114.

The utility meter module 102 does not need to be connected to the dwelling wiring, which allows the translator module 110 and the utility meter module 102 to be pressurized by internally mounted nitrogen or carbon dioxide sources. A wireless utility meter module 102 also eliminates the need for "potting", a process in which epoxy fills the cavities of the utility meter module 102 and creates a seal against water and dirt, among other things. Elimination of the "potting" reduces the production cost of the system.

The pit set system 100 may utilize a nation-wide 217 license for pit data transmission. Using a 217 MHz channel improves signal propagation through dirt and water and permits using low cost transmitters. The 217 MHz channel also allows low power RF transmission from the utility meter module 102. Alternatively, numerous other licensed and unlicensed frequency bands can be utilized.

Figure 2:
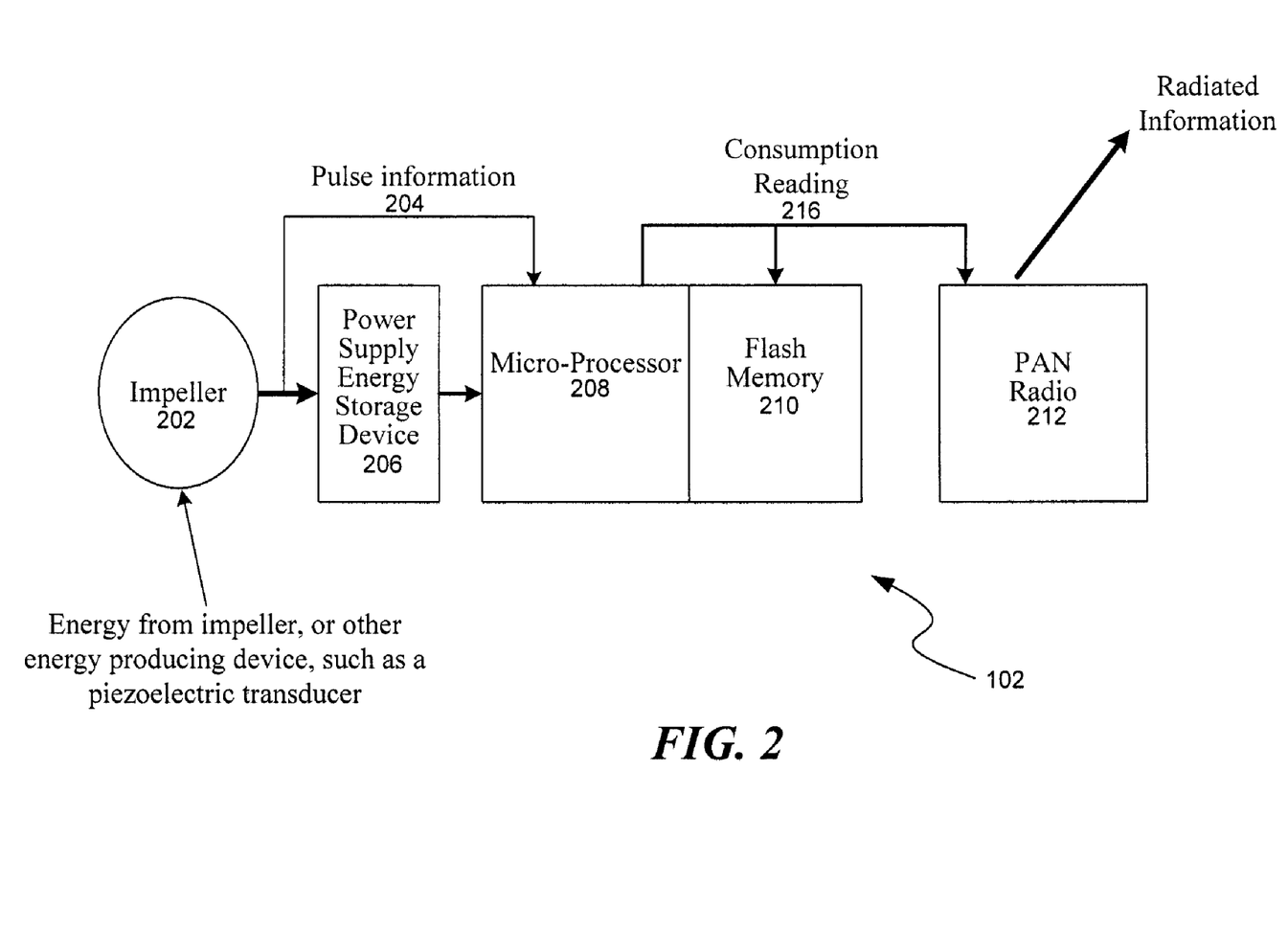
FIG. 2 illustrates the components of a utility meter module contained within a pit set system.

FIG. 2 illustrates components of the utility meter module 102 contained within the pit set system. In one embodiment an impeller 202 contains a magnetic generator or other transducer that creates energy. The generated energy may be stored in a power supply energy storage device 206. The impeller 202 may also generate pulse information 204 that is transmitted to a microprocessor 208, and which represents a consumption reading 216 for the meter, wherein the input to the impeller is provided by the utility meter. Input energy to drive the impeller/generator is taken from the utility such as from gas/water pressure or gas/water movement. A memory, such as flash memory 210, stores the consumption reading 216 which is also transmitted to a PAN (Personal Area Network:

refers to the interconnection of information technology devices within the range of an individual person—a few meters—for the purpose of communication) radio 212 to be radiated to the translator module 110 or directly to the reader 114.

In another embodiment a piezoelectric transducer is used to generate electricity from mechanical strain caused by the environment. The piezoelectric transducer can produce enough energy to frequently update the translator module 110 so that whenever a reader 114 drives by, the translator module 110 transmits the most recent consumption readings from one or more utility meter modules 102 to the reader 114.

In an alternative embodiment, a magnetic generator, which comprises a magnet and a coil, converts mechanical motion into electrical pulses. A magnetic generator can produce sufficient energy to increment a solenoid operated odometer counter. Using low power microprocessors and non-volatile memories, the consumption information may be stored until needed and requested by a wake-up call.

The use of a piezoelectric transducer, magnetic generator, or other power generators to power the utility meter module 102 can lead to a reduction in costly wiring and consumption of batteries. Because of the long life of typical water meters (30 years) and the undesirability of electrolysis, which is caused by a constant current, a battery-less water pit system is advantageous. Electrolysis, which occurs when an electric current breaks the chemical compounds of a water solution, hampers the performance of the battery and/or other components of a utility meter module. In addition, a battery-less system eliminates the problems caused by moisture entering the battery. In previous water pit systems, meters had to be replaced when their battery died. By replacing batteries with piezoelectric transducers, the average life span of a utility meter module 102 can be significantly increased.

As mentioned above, flash memory 210, which is a non-volatile memory device that retains its data after the power is removed, can be used to store consumption readings from the meter. Flash memory 210 allows the utility meter module 102 to power off until a reader 114 drives by to collect meter readings. When a reader 114 energizes or "wakes up" the flash memory 210, the flash memory 210 transmits the consumption reading 216 via a pulse. This process conserves energy by allowing the utility meter module 102 to turn itself off when not in use. Of course other memory devices may be used.

Once the consumption reading 216 leaves the flash memory 210, it is transmitted to a PAN (personal area network) radio 212. PAN utilizes magnetic field transmission and reception for short range communication. PAN modules have a low power requirement and short range propagation characteristics. In previous water pit systems, troubleshooting a faulty utility meter module proved difficult since the faulty utility meter module could no longer communicate with the user. The use of a PAN radio 212 ensures that if the utility meter module 102 malfunctions, the self-contained PAN radio 212 can determine the source of the malfunction. The PAN radio 212 determines if it can "wake up" or request information from the meter, and from a corresponding response it can determine the source of the error. Alternative embodiments to PAN modules include Bluetooth, WiFi (Wireless Fidelity), Home RF (radio frequency), ultrasound, IR (infrared), and IEEE 802.11.

In an alternative embodiment, the module 102 receives sufficient power to send a short RF (radio frequency) message upon receipt of the pulse information. The module 102 and radio are thus similar to RFID (radio frequency identification) in which an electromagnetic field is used to activate a device.

In effect, the electromagnetic field induces an electric current, stores it in the device 206 (e.g. a capacitor), energizes the device, and turns it on. This embodiment illustrates another example of how energy can be generated. In another alternative embodiment, a microprocessor stores the pulse information in an EE-PROM or in a Flash memory until illuminated by a high powered transmitter or a "wake up" signal from the reader 114.

A high power transmitter is necessary for transmission to a central radio and this may provide the illumination of the "RFID portion" of the module 102. Once illuminated by the high power transmission, the energy accumulated from the previous pulse transmission may be used to activate the next pulse. This creates a continuous loop in which a previous transmission energizes a subsequent transmission. This embodiment illustrates another example of how energy can be generated to activate the system.

Figure 3:
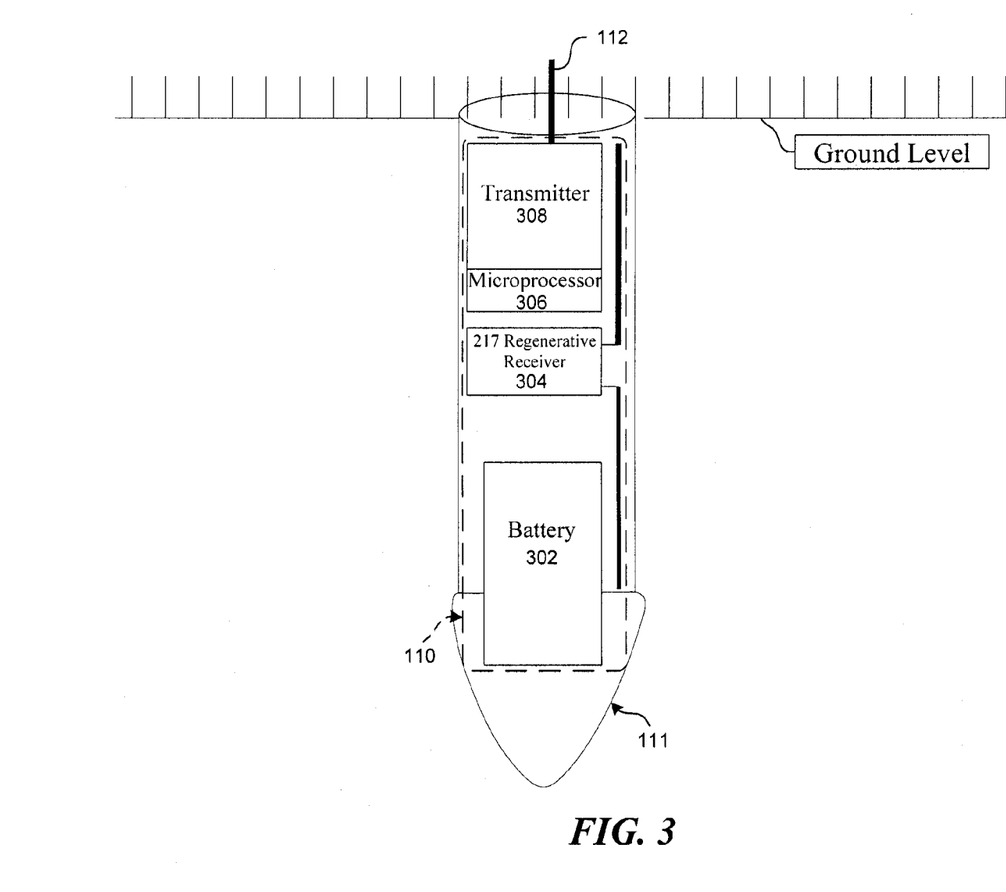
FIG. 3 illustrates components of a translator module contained within a pit set system.

FIG. 3 illustrates the components of a "leak-proof" translator module 110 contained within the pit set system 100. Each translator module 110 can serve multiple pits if the translator module 110 is within the low power signal range of these pits. A battery 302 powers the translator module 110. A 217 MHz or an alternative frequency regenerative receiver 304 allows for high power transmission. A microprocessor 306 verifies the integrity of the low power signal and decodes it. The microprocessor 306 then converts the low power signal to a higher power signal. A transmitter 308 waits for a wake-up call from the reader before transmitting the higher power signal to the reader through an antenna 112.

The placement of the translator module 110 in relation to the pit lid 108 has been a major concern in past designs. In previous water pit systems, the translator module 110 was placed underneath the pit lid 108, sealed within the pit enclosure. This caused about 30 dB signal loss. To overcome this loss, the translator module 110 needed to transmit at a higher RF power to provide adequate signal strength to the reader, which increased the system cost, wasted energy, and diminished the life-span of the battery-powered systems. Attempting to remedy the situation by placing the translator module 110 on top of the pit lid 108 created other problems such as with vehicles and pedestrians.

In some of the disclosed embodiments of the invention the translator module 110 is integrated with or positioned by the pit lid 108. The antenna 112, which may sit on top of the pit lid 108, passes through the pit lid 108 by means of a hole and will not project more than about ⅝ inch above the highest projection on the pit lid 108. The pass through hole for the antenna 112 does not need to be larger than about ⅝ inch in diameter to allow easy hand drilling on site. Regardless of the position of the antenna 112, the translator module 110 may be above, below, or within the pit lid 108.

The translator module 110 can be also installed in the ground, close to the pit lid 108. The placement of the translator module 110 adjacent to the pit lid 108 allows the utility meter module 102 to transmit at a lower power, conserve energy, and to decrease the overall cost of the system, while avoiding a potential stumbling hazard. In addition, by transmitting at a lower relative power, the battery 302 requires less power and is typically smaller.

The microprocessor 308 verifies the integrity of the incoming low power RF signal, decodes the signal to be re-transmitted to the reader 114 at a higher power. This allows a water pit system 104 to conserve energy while ensuring that the signal 118 reaches the reader 114 with adequate power.

Figure 4:
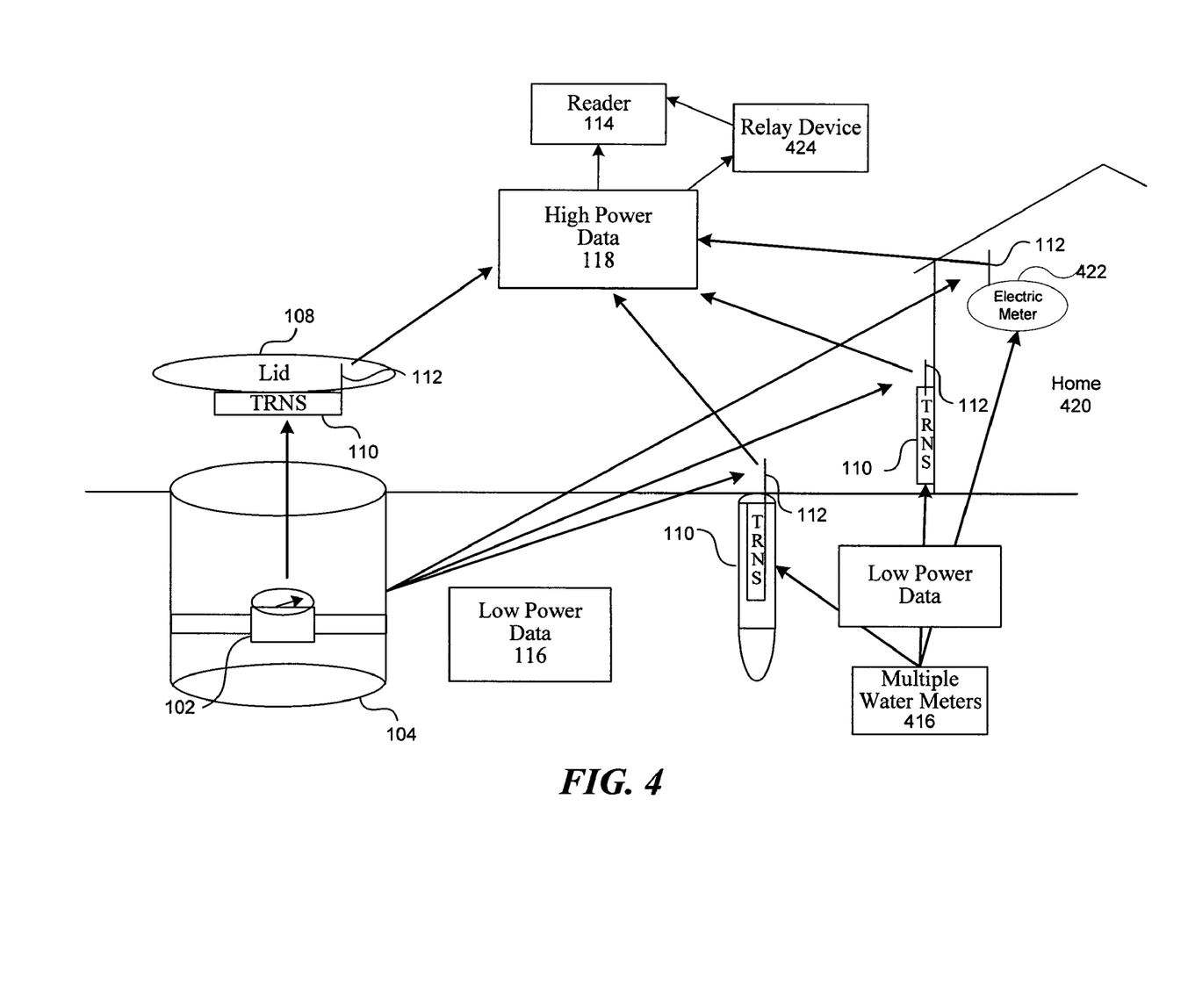
FIG. 4 illustrates a re-transmission of low power signals at higher power from multiple meter systems mounted at various locations.

FIG. 4 illustrates a method by which a low power signal can be re-transmitted at a higher power from multiple meter systems. The utility meter module 102 transmits low power data 116 to the translator module 110. The translator module 110 may be located underneath, on top of, or adjacent to a pit lid 108. The translator module 110 re-transmits the low power data signal 116 as high power data 118 to the reader 114 through antenna 112. In addition, low power data 116 from other multiple meters 416 can also be re-transmitted as high power data 118 by the translator module 110. In an alternative embodiment, multiple water meters 416 can re-transmit low power data 116 as high power data 118 through a translator module or an electric meter 422 located in or near a home 420.

In another alternative embodiment, the signal 118, transmitted by the translator is received by a relay device 424. The relay device 424 verifies and decodes the received signal before re-transmitting the signal at a higher power to the reader 114. This embodiment illustrates an example where a low power signal can be re-transmitted as a high power signal through more than one intermediate steps.

In yet another embodiment, a transmitter is mounted directly on the utility meter module 102 or is integrated into the utility meter module 102. The transmitter may be RF, IR, acoustic, or any other wireless means of communication. The transmitter "bubbles up" consumption data wirelessly to an AMR (Automatic Meter Reading) device mounted on the pit lid 108. The AMR device relays the consumption data to a reader.

In an alternative embodiment, a high power transmitter located at the pit lid 108 may be used to overcome attenuation and to transmit the consumption data at a higher power. The use of a high power transmitter increases energy costs but provides the signal strength that is needed to effectively transmit consumption data to the reader.

Figure 5:
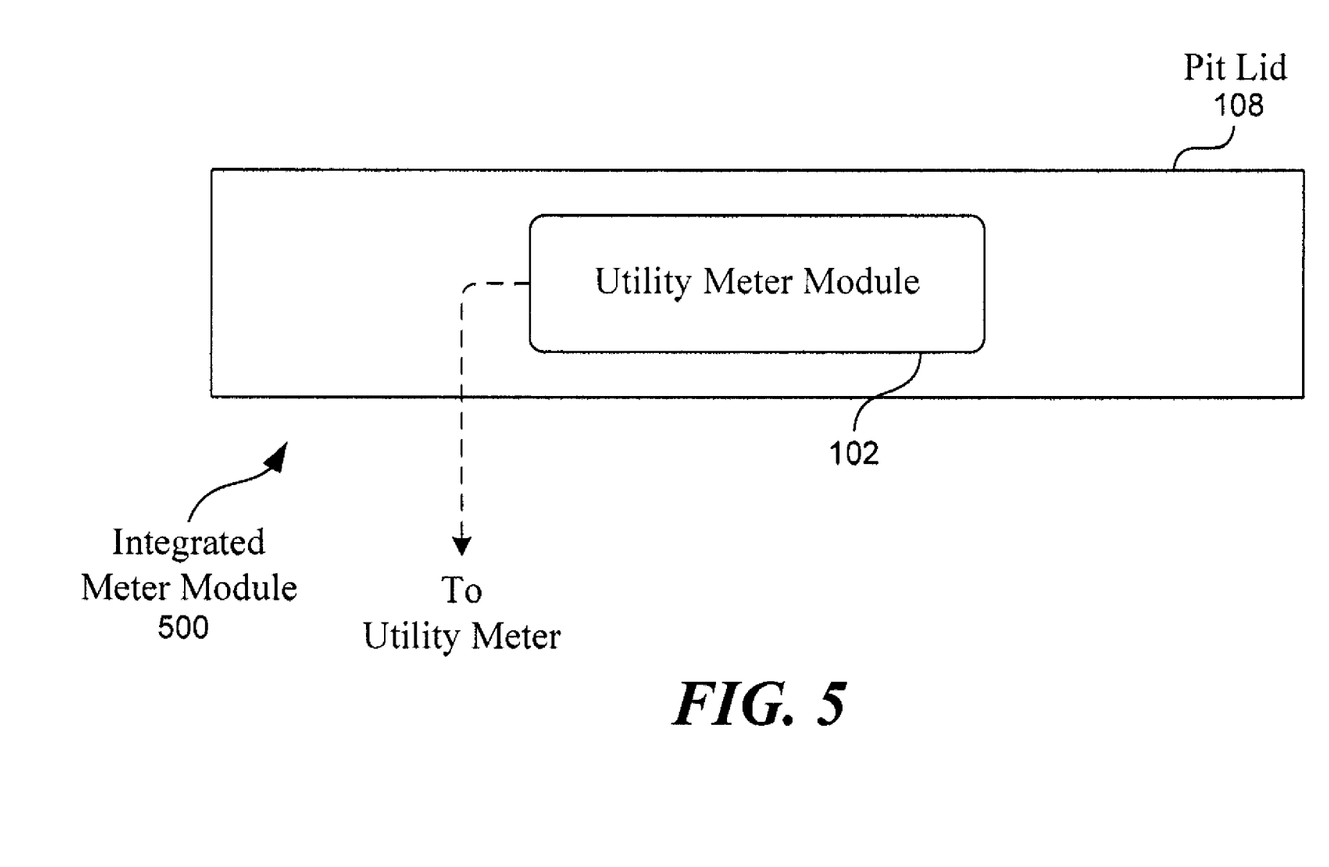
FIG. 5 is a cross-sectional view of a pit lid illustrating components of an integrated meter module within the lid.

FIG. 5 illustrates the components of an integrated meter module 500. In this embodiment, at least a part of the utility meter module 102, such as the endpoint, is placed inside a pit lid 108. Integrating at least a part of the utility meter module 102 into the pit lid 108 reduces RF attenuation caused by the pit lid 108. In some cases, RF attenuation can be as much as 30 dB or more. In addition, placing at least a part of the utility meter module 102 inside the pit lid 108 makes the system less intrusive, providing protection for the utility meter module 102 from environmental or man-made factors. In some embodiments, a cable may connect the endpoint to the meter/register to receive meter reading data.

In yet another embodiment, the translator module 110 may be placed in the lid 108 and the utility meter module endpoint near the meter, with a wireless link therebetween. These embodiments illustrate examples of how the utility meter module 102 can be placed within a metering system to improve signal propagation.

Figure 6:
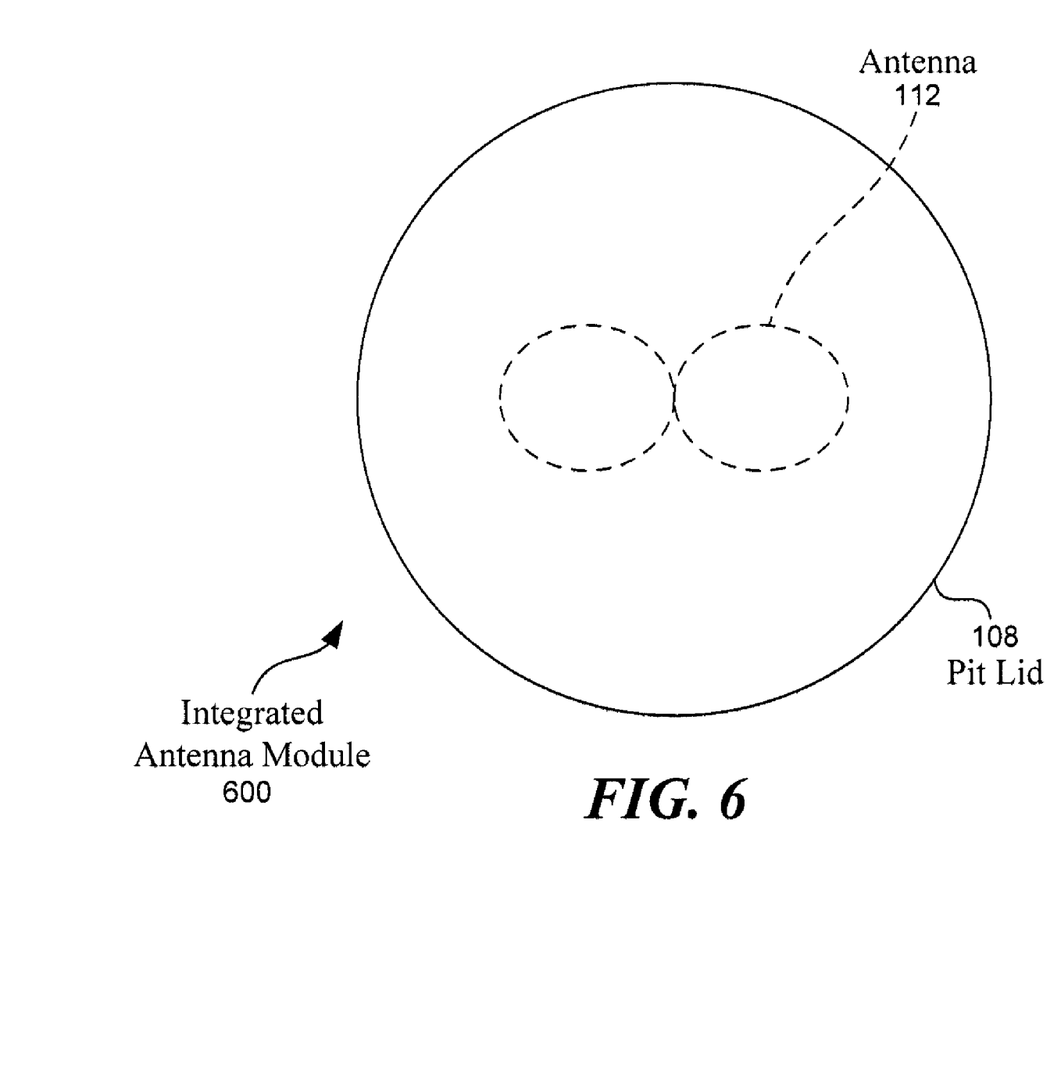
FIG. 6 is a top view of a pit lid illustrating components of an integrated antenna module within the lid.

FIG. 6 illustrates the components of an integrated antenna module 600. In this alternative embodiment, antenna 112 is placed inside a pit lid 108 (while one type of antenna is shown, any other type of antenna may be employed). Integrating an antenna into the pit lid 108, or in some embodiments inside the pit wall(s), enhances the RF performance of a utility meter module mounted above, below, through, or internal to a pit lid 108. The integrated antenna module 600 enhances RF performance by reducing or eliminating attenuation caused by the pit lid 108 and, in some instances, may even provide aperture gain. In addition, the module can improve radiation pattern and prevent tampering by not being visible. The antenna 112 may be connected wirelessly or via a cable to the other components in the pit.

In another embodiment, the antenna 112 mounts flush with the outer surface of the pit lid or the pit wall(s). As a result, the design minimizes potential damage to the antenna structure from vehicular, other traffic, or other factors. However, the antenna assembly may still be seen on the exterior surface of the lid or the pit wall(s), and the component housing, which houses the antenna components, still passes through the lid or the wall(s) to expose the housing to within the pit structure.

CONCLUSION

While specific circuitry may be employed to implement the above embodiments, aspects of the disclosed embodiments can be implemented in any suitable computing environment. Although not required, aspects of the embodiments may be implemented as computer-executable instructions, such as routines executed by a general-purpose computer, e.g., a server computer, wireless device or personal computer. Those skilled in the relevant art will appreciate that the aspects can be practiced with other communications, data processing, or computer system configurations, including: Internet appliances, hand-held devices (including personal digital assistants (PDAs), wearable computers, all manner of cellular or mobile phones, multi-processor systems, microprocessor-based or programmable consumer electronics, set-top boxes, network PCs (personal computers), mini-computers, mainframe computers, and the like.

Some aspects of the embodiments can be implemented in a special purpose computer or data processor that is specifically programmed, configured, or constructed to perform one or more of the processes explained in detail herein.

Aspects of the disclosed embodiments can be implemented in the form of methods and apparatuses for practicing those methods or in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing different aspects of the invention. These aspects can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing different aspects of the invention.

Unless the context clearly requires otherwise, throughout this document, the words "comprise", "comprising", "including" and the like are to be construed in an inclusive sense as opposed to an exclusive or exhaustive sense; that is to say, in the sense of "including, but not limited to". Additionally, the words "herein," "above" and "below" and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while blocks are presented in a given order, alternative embodiments may employ systems having blocks, in a different order, and some processes or blocks may be deleted, moved, added, subdivided, combined, and/or modified. Each of these blocks may be implemented in a variety of different ways. Also, while some blocks are at times shown in series, these blocks may instead be in parallel, or may be performed at different times. Where the context permits, words in the above Detailed Description using the singular or plural number may also include the plural or singular number respectively.

The teachings of the invention provided herein can be applied to other systems, not necessarily the system described herein. The elements and acts of the various embodiments described above can be combined to provide further embodiments. Any referenced patent and/or patent application or any other reference, including any that may be listed in accompanying filing papers are incorporated herein by reference. Aspects of the invention can be modified, if necessary, to employ the systems, functions, and concepts of the various references that may have been described herein to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein. Particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

While certain aspects of the invention are presented below in certain claim forms, the inventors contemplate the various aspects in the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. An automated meter reading (AMR) system for wirelessly providing utility meter readings, the AMR system comprising:
   a utility pit system having a pit housing to be at least partially received within a pit, and a pit lid for at least partially covering the pit housing;
   a utility meter received within the pit housing; and
   at least one utility meter reading module for obtaining utility data from the utility meter, wirelessly or via a wired connection, and wirelessly transmitting the utility data via a low-power, shorter-range wireless communications protocol to an active pit translator module that amplifies the utility data signal, and transmits the amplified utility data signal via a longer-range wireless communications protocol, wherein the utility meter reading module is under, over, or an integral part of the pit lid, or is an integral part of the pit housing, or an antenna of the utility meter reading module is under, over, or an integral part of the pit lid, or a combination thereof, and wherein:
   the active pit translator module is configured to receive the utility data signal from the utility meter reading module, amplify the received signal to a power that is sufficient to reach a reader or high-power intermediate repeater and re-transmit the amplified utility data signal via a longer-range wireless communications protocol for reception by a reader or a high-power intermediate repeater;

the active pit translator module is substantially close to, under, over, or an integral part of the pit lid or is an integral part of the pit housing; and an antenna of the active pit translator module is substantially close to, mounted over, an integral part of, or protruded through a hole in the pit lid or is an integral part of or protruded through a hole in the pit housing.

2. The AMR system of claim 1, wherein the low-power, shorter-range wireless communications protocol is chosen from RF(radio frequency), low frequency electromagnetic radiation, acoustic, Bluetooth, WiFi (Wireless Fidelity), ultrasound, IR (infrared), or IEEE 802.11 technology.

3. The AMR system of claim 1, wherein a utility data acquisition module sends a wake-up call to the active pit translator module to transmit the amplified utility meter readings to the utility data acquisition module.

4. The AMR system of claim 1, wherein the low-power, shorter-range wireless communications protocol operates at 217 MHz.

5. The AMR system of claim 1, wherein the utility meter reading module further comprises:

a piezoelectric device, a magnetic generator, or other transducers that generate energy and pulse information that represents a consumption reading for the meter;

an energy storage module for storing the generated energy;

a microprocessor for receiving the generated pulse information;

a memory for storing the meter consumption readings; and a PAN (personal area network) radio receiving pulse information and radiating the received information to the active pit translator module.

6. The AMR system of claim 1, wherein the active pit translator module further comprises:

a battery for powering the active pit translator module;

a regenerative receiver for receiving low power signals from the utility meter reading module via a shorter-range communications protocol;

a microprocessor for verifying integrity of the low power signal and decoding the signal and for converting the low power signal to a higher power signal; and a transmitter for transmitting the utility data signal at the higher power via a longer-range communications protocol.

7. An apparatus for wirelessly translating a utility consumption meter reading, a utility sensor reading, or both, from an access to the utility within a pit, the apparatus comprising:

a receiver unit for wirelessly receiving, via a shorter-range wireless communications protocol, a low power meter reading signal from a utility meter reading module, from utility sensors, or both;

an active transmitter unit for amplifying the received low power meter reading signal and transmitting the amplified readings signal via a longer-range wireless communications protocol to a mobile or stationary utility meter data gathering unit, wherein the transmitter unit is substantially close to, under, or an integral part of a pit lid of a utility meter pit or is an integral part of a pit wall, and wherein an antenna of the transmitter unit is substantially close to, mounted over, an integral part of, or protruded through a hole in the pit lid or is an integral part of, or protruded through a hole in the pit wall or implanted within at least one surface plane of the pit lid;

a battery unit for energizing the units; and a processor unit coupled among the receiver unit, transmitter unit, and battery unit.

8. The apparatus of claim 7, wherein the processor unit is utilized for signal integrity verification, decoding, amplification, or a combination thereof.

9. A utility data gathering apparatus for wirelessly gathering utility meter data, the apparatus comprising:

an endpoint module for receiving utility data from a utility meter positioned in a utility meter pit and for wirelessly transmitting the received data via a low-power, shorter-range wireless communications protocol an active pit translator module to be amplified and relayed via a longer-range wireless communications protocol to remote receiving units, wherein the endpoint module is in close proximity of the utility meter; and an active pit translator unit for receiving a low power data signal from the endpoint, amplifying the received signal to a power that is sufficient to reach a reader unit or high-power intermediate repeater, and re-transmitting the data signal via a longer-range wireless communications protocol to a reader unit or to a high-power intermediate repeating modules or to both, wherein the active pit translator unit is substantially close to, under, or integrated into a pit lid that at least partially covers the pit or is integrated into pit wall(s), and wherein an antenna of the active pit translator unit is substantially close to, mounted over, integrated into, or protruded through a hole in the pit lid or pit wall(s) or is implanted within at least one surface plane of the pit lid.

10. A utility meter pit set comprising:

a utility meter pit lid; and a utility meter pit configured to house:

a utility metering unit for measuring utility consumption;

an active utility meter reading module for receiving utility data, wirelessly or via a wired connection, from the utility metering unit and transmitting the utility data, wirelessly to an active pit translator via a low-power, shorter-range wireless communications protocol, wherein the utility meter reading module is under, over, or an integral part of the pit lid, or an antenna of the utility meter reading module is under, over, or an integral part of the pit lid, or a combination thereof; and an active pit translator for receiving the utility data signal from the utility meter reading module via the low-power, shorter-range wireless communications protocol, amplifying the received utility data signal and transmitting, via a longer-range wireless protocol, the amplified utility data signal to a mobile or stationary data gathering device, wherein the active pit translator is attached under or is at least partially implanted in the pit lid, and wherein the active pit translator is near to the utility meter reading module while the data gathering device is far from the utility meter reading module.

11. The pit set of claim 10, wherein an antenna of the active pit translator is substantially close to, mounted over, integrated into, protruded through a hole in the pit lid or pit wall(s), embedded within at least one surface plane of the pit lid, or a combination thereof.

12. The pit set of claim 10, wherein a memory module stores the utility data to be transmitted to the active pit translator upon a wake-up call.

13. The pit set of claim 10, wherein the utility meter reading module transmits stored utility data to the active pit translator upon receiving a wireless signal from the active pit translator.

14. The pit set of claim 10, wherein a high power signal transmission from the active pit translator energizes the utility meter reading module for a subsequent transmission to the active pit translator.

15. The pit set of claim 10, wherein a piezoelectric transducer, a magnetic transducer, or a non-battery electricity generating unit energizes the utility meter reading module.

16. The pit set of claim 10, wherein the utility meter reading module and the signal transceiver communicate with one another via RE (radio frequency), low frequency electromagnetic radiation, acoustic, Bluetooth, WiFi (Wireless Fidelity), ultrasound, IR (infrared), or IEEE 802.11 technology.

17. A utility meter pit set, including a pit housing that is at least partially within a pit, the pit set comprising:
   an endpoint module for obtaining utility data from a utility meter situated within the pit housing and wirelessly transmitting the utility data to an active pit translator via a low-power, shorter-range wireless protocol; and
   an active pit translator device for receiving the utility data signal from the endpoint module via the low-power, shorter-range wireless protocol, amplifying the received utility data signal, and transmitting the amplified data signal to a mobile or stationary data gathering machine via a longer-range wireless protocol, wherein the active pit translator is situated within a low power signal range of the endpoint module.

18. The pit set of claim 17, wherein one active pit translator device serves more than one utility meter.

19. An apparatus for wirelessly transmitting utility meter readings from a utility supply in a utility meter pit, the apparatus comprising:
   means for obtaining utility data from the utility supply in the utility meter pit, wirelessly or via a wired connection, and wirelessly transmitting the utility data via a low-power, shorter-range communications protocol, wherein the means for obtaining utility data is near to the utility supply and toward a bottom of the utility meter pit; and
   translator means for receiving the wirelessly transmitted utility data via the low-power, shorter-range communications protocol, for amplifying the received wirelessly transmitted utility data, and for relaying the amplified utility data to at least one data gathering unit via a longer-range communications protocol, wherein the translator means is substantially close to a top of the utility meter pit.

20. The apparatus of claim 19, wherein the relaying means is attached under or is at least partially an integral part of a pit lid or is an integral part of pit wall(s).

21. The apparatus of claim 19, wherein an antenna of the relaying means is substantially close to, mounted over, integral part of, or protruded through a hole in a pit lid that at least partially covers the pit or is an integral part of or protruded through a hole in pit wall(s) or is set in at least one surface plane of the pit lid.

22. A utility data gathering apparatus for wirelessly gathering utility meter data, utility sensor data, or both, the apparatus comprising:
   an active utility meter data reading module, positioned in a utility meter pit, for receiving utility data from a utility meter that is also positioned in the utility meter pit, and for wirelessly transmitting the received data to an active pit translator module via a low-power, shorter-range communications protocol; and
   an active pit translator module for receiving the data signal from the utility meter data reading module or utility sensors, amplifying the received signal to a power sufficient to reach a reader unit or high-power signal repeating module, and re-transmitting the amplified data signal via a longer-range communications protocol to a reader unit or to a high-power signal repeating modules or to both, wherein the active pit translator module is substantially close to, under, over, integral part of, or at least partially embedded into a pit lid, and wherein an antenna of the active pit translator module is substantially close to, mounted over, integrated into, or protruded through a hole in the pit lid or is implanted in at least one surface plane of the pit lid.

* * * * *

UNITED STATES PATENT AND TRADEMARK OFFICE
CERTIFICATE OF CORRECTION

PATENT NO.         : 7,453,373 B2                                              Page 1 of 1
APPLICATION NO. : 11/261902
DATED              : November 18, 2008
INVENTOR(S)        : Cumeralto et al.

It is certified that error appears in the above-identified patent and that said Letters Patent is hereby corrected as shown below:

In column 8, line 67, in Claim 1, delete "repeater" and insert -- repeater, --, therefor.

In column 9, line 58, in Claim 7, delete "readings" and insert -- reading --, therefor.

In column 10, line 19, in Claim 9, delete "endpoint," and insert -- endpoint module, --, therefor.

In column 11, line 14, in Claim 16, delete "RE" and insert -- RF --, therefor.

Signed and Sealed this

Tenth Day of February, 2009

JOHN DOLL
*Acting Director of the United States Patent and Trademark Office*